United States Patent [19]

Barrot et al.

[11] 3,805,172

[45] Apr. 16, 1974

[54] DEVICE FOR STORING THE AMPLITUDE OF AN ELECTRIC SIGNAL

[75] Inventors: Jean-Pierre Barrot, Leognan; Christian Jaussein, Gradignan; Andre Yastroubinski, Pessac-Alouette, all of France

[73] Assignee: Commissariat A L'Energie Atomique, Paris, France

[22] Filed: Apr. 18, 1972

[21] Appl. No.: 245,240

[30] Foreign Application Priority Data

Apr. 22, 1971 France ............................. 71.14398

[52] U.S. Cl. ................. 328/151, 307/246, 328/122, 328/126, 328/164

[51] Int. Cl. ........................ G11c 11/24, G11c 11/34

[58] Field of Search ............ 307/235 R, 235 A, 237, 307/241, 242, 246, 264; 328/122, 126, 129, 150, 151, 164, 171, 172, 173

[56] References Cited

UNITED STATES PATENTS

| | | | |
|---|---|---|---|
| 3,195,055 | 7/1965 | Dean | 328/164 X |
| 3,237,023 | 2/1966 | Wilhelm | 328/151 X |
| 3,473,131 | 10/1969 | Perkins, Jr. | 328/164 X |
| 3,584,310 | 6/1971 | Hoch Felder et al. | 328/171 X |
| 3,696,253 | 10/1972 | Deisch | 307/235 A |

OTHER PUBLICATIONS

Claassen et al., "Transient Measuring Sample and Hold Detector," IBM Tech. Dis. Bull., Vol. 12, No. 8, pp. 1233–1234, 1/1970.

Frushour, "Peak Voltage Detection," IBM Tech. Dis. Bull., Vol. 12, No. 7, p. 990, 12/1969.

*Primary Examiner*—Rudolph V. Rolinec
*Assistant Examiner*—L. N. Anagnos

[57] ABSTRACT

The device for storing the amplitude of an electric signal comprises a storage cell having a capacitor which is intended to be charged by the signal through a diode and means for reading the charging voltage. The device comprises a cell for correcting variations in dynamic resistance of the diode, the correction cell having the same electrical characteristics as the storage cell and being subjected to the same signals, and means for injecting upstream of the storage cell a current which is proportional to the error voltage arising from the current which passes through the diode.

9 Claims, 6 Drawing Figures

DEVICE FOR STORING THE AMPLITUDE OF AN ELECTRIC SIGNAL

This invention relates to a device for storing the amplitude of an electric signal having a limited time-width or duration which can be very short. The amplitude which will be considered hereinafter will be that of the voltage of the signal since a measurement of current can always be converted to a measurement of voltage.

An ideal memorization or storage device would be one in which the exact value of the amplitude of a signal would be recorded even in the case of a signal of infinitely short duration and in which this information would be retained indefinitely until it is either utilized or erased. Real memory or storage devices fail to satisfy these ideal conditions. The quality of a device is usually evaluated on the basis of the three following characteristics:

The systematic error (expressed either as relative value or as absolute value); this error, which is proportional to the difference between the recorded amplitude $V_s$ and the amplitude applied to the input $V_E$, must be as small as possible and must not vary to any appreciable extend over a broad dynamic range of operation;

The access time $t_a$ (minimum time during which the information must be applied to the input in order that the recorded information should not differ by more than $\epsilon$ percent of the applied information): this time interval must be as short as possible;

The holding time $t_m$ (maximum time during which the device retains the recorded result with a relative error of less than $\epsilon$ percent; this time interval must be as long as possible.

The conventional device which is employed for recording the amplitude of an electric pulse consists of a diode placed in series with a capacitor: this device is subject to a systematic error which corresponds to the displacement voltage of the diode and has a holding time which is limited by the leakage currents through the parasitic resistances of the circuit. Attempts have already been made to eliminate the systematic error by associating with the diode a current generator which causes a continuous low current to flow therein and to reduce the access time by reducing the value of the capacitance. However, this reduction also reduces the holding time.

The aim of the present invention is to provide a device for storing the amplitude of an electric signal which provides more effective compliance with practical requirements than devices of the prior art, especially insofar as it has a short access time and a systematic error which is also of small magnitude and substantially independent of the shape of the applied signal (in particular of its steepness). The device according to the invention comprises a capacitor which receives a charge current produced by said signal across a diode and if necessary a matching stage and which is charged at a voltage substantially proportional to said amplitude. The device is primarily characterized in that it comprises a cell for correcting variations in dynamic resistance of the diode, said correction cell having the same electrical characteristics as the storage cell and subjected to the same signals, and means for injecting upstream of the storage cell a current which is proportional to the error voltage arising from the current which passes through the diode.

The invention also proposes, with a view to increasing the holding time, an assembly which is constituted by a plurality of cascade-connected devices of the above-mentioned type and which retains the short access time of the first device considered separately.

A better understanding of the invention will be gained from the following description of a device constituting a particular mode of application of the invention which is given by way of non-limitative example, and of a comparison between this latter and a device in accordance with the prior art. Reference is made in the description to the accompanying drawings in which.

Figure 1:
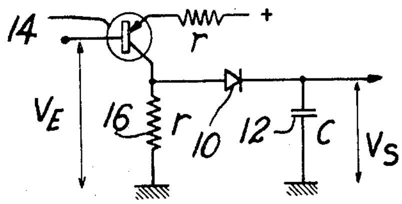
FIG. 1 is a schematic diagram of a conventional amplitude storage device incorporating a current-generating input stage.

The device shown diagrammatically in FIG. 1 is intended to store the amplitude $V_E$ of the voltage of an input electric signal. This device comprises in conventional manner a diode 10 connected in series with a capacitor 12 having a capacitance C. If a voltage $V_E$ is applied to the diode, there appears and is maintained at the terminals of C a voltage $V_s$ which is equal to the difference between $V_E$ and the displacement voltage $V_D$ of the diode 10. As has been stated earlier, said displacement voltage can be eliminated by associating with the diode 10 a pre-biasing circuit (not shown) comprising a current generator which passes a constant current $i_o$ of low value through the diode 10 in the forward direction. Any displacement which may still exist in the polarization in the state of rest disappears in the signals $V_s$ and $V_E$ which are counted from these polarizations.

The device which is illustrated in FIG. 1 also comprises an impedance-matching input stage. A stage of this type is often made necessary by the excessive internal impedance of the generator which delivers the amplitude signal $V_E$ to be measured. The input stage which is illustrated is constituted by a transistor 14, the emitter and collector of which are connected respectively to the source of supply and to ground (earth) through resistors having the same value *r*. The amplitude signal $V_E$ to be measured is applied to the base and the voltage applied to the diode 10 is taken from the terminals of the collector resistance 16. This resistance 16 is then equivalent to a voltage source having an electromotive force $V_E$ and an internal impedance *r*. As the output takes place on the collector of the transistor 14, any voltage modifications which take place at the output have only a negligible influence on the input.

Figure 2:
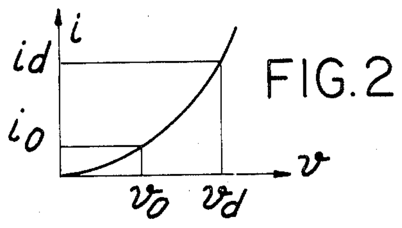
FIG. 2 is a curve representing the variation in current passing through the diode of FIG. 1 as a function of the voltage applied thereto, and showing the curvature or bend of the characteristic curve and the resultant variation in resistance.

The device of FIG. 1 has a serious defect by reason of the variation in apparent resistance of the diode 10 over the range of current-voltage characteristics as shown diagrammatically in FIG. 2. In this figure, the bias voltage and the corresponding current are designated by the references $v_o$ and $i_o$ whilst the voltage and the current for one particular point of operation are designated by the references $v_d$ and $i_d$. The static resistance of the diode at this point of operation is accordingly equal to:

$$V_d - V_o / i_d - i_o \tag{1}$$

Figure 3:
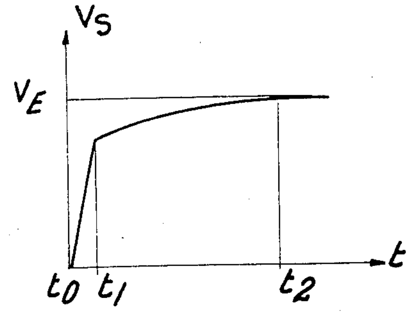
FIG. 3 shows the curve of variation of the output voltage $V_s$ of the circuit arrangement of FIG. 1 as a function of time.

It is apparent that, as the capacitor 12 is charged and the current decreases within the diode 10, so the resistance is modified. By integration, it is possible to calculate in an approximate manner the variation in output voltage $V_s$ as a function of the input voltage $V_E$ and to plot the curve of FIG. 3; this curve shows:

A fast rise of the voltage $V_s$ during a time interval $t_1 - t_0$, the duration of which is dependent on the time constant $rC$ and is of the order of a few nanoseconds in the case of a storage cell which makes use of a capacitor having a value of a few picofarads; the relative error $(V_E - V_s)/V_E$ at the instant $t_1$ is usually about 15 percent.

An asymptotic variation of $V_s$ beyond $t_1$, of the form:

$$V_s = V_E - \Delta V_s = V_E - \text{Log}\,(1)/\alpha t + \beta / V_E \tag{2}$$

The above formula shows that $V_s$ is always smaller than $V_E$ by a quantity $\Delta V_s$ which tends towards zero progressively as the time of application of $V_E$ is lengthened. In practice, in the case of ordinary devices, it is only necessary to ensure that $t_2 - t_1$ is of the order of 300 nanoseconds in order that the relative error $(V_E - V_s)/V_E$ should be reduced to 1 percent. The time intervals $t_2 - t_1$ and $t_1 - t_0$ as well as the constants $k$, $\alpha$ and $\beta$ are practically independent of the type of diode.

Formula (2) shows that the error in the measurement of $V_E$ is independent of $V_E$ as soon as the voltage has a sufficiently high value which, in practice, is higher than about 200 millivolts when $r = 100$ ohms. The second term of the denominator is in fact negligible compared with the first. But formula (2) also shows that the error represents the voltage drop at the terminals of the assembly consisting of the diode 10 and the resistor 16.

In order to correct this defect, the present invention makes use of the following method: the signal $V_E$ is applied not only to a storage cell but also to a cell for producing a correction signal and comprising a diode, a capacitor and a resistor, the values of which are the same as those of the diode 10, the capacitor 12 and the resistor 16 in order to develop at the terminals of the resistor and of the diode a signal having an amplitude which is substantially equal to that of the error. This signal which corresponds to the error $\Delta V_s$ is then added algebraically to the signal $V_E$ before being applied to the measuring diode-capacitor cell. Addition at this level is made possible by the fact that the amplitude error given by formula (2) is substantially independent of $V_E$ and therefore does not change if a correction term is added to $V_E$.

Figure 4:
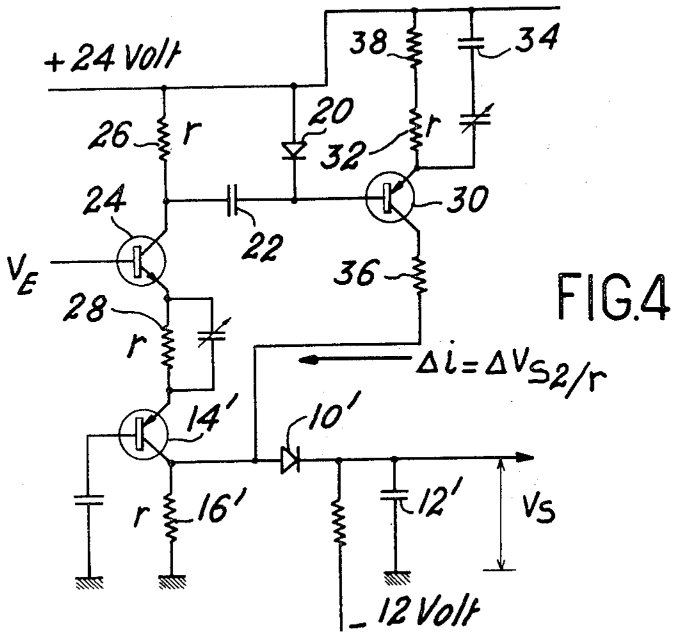
FIG. 4 is a schematic diagram of the device according to the invention.

The device shown diagrammatically in FIG. 4 comprises a storage cell constituted by elements corresponding to those of FIG. 1 and designated for the sake of enhanced clarity by the same reference numeral followed by the prime index. The output signal $V_s$ is collected from a capacitor 12' having a capacitance C and charged through the diode 10'. In addition, there is again shown a transistor 14', the collector circuit of which comprises a resistor 16' having a value $r$, the voltage for driving the diode 10' being collected at the terminals of said resistor.

The device of FIG. 4 additionally comprises a cell for producing a correction voltage $\Delta V_{s2}$, constituted by elements having the same characteristics as those of the storage cell proper. This circuit comprises a diode 20 having the same characteristics as the diode 10' and a capacitor 22 having the same capacitance C as the capacitor 12'. The capacitor 22 is charged through a current-generating circuit which constitutes a duplication of the circuit which charges the capacitor 12': this circuit comprises a transitor 24 of a type which is complementary to the transistor 14' (*n-p-n* if the transitor 14' is of the *p-n-p* type), the amplitude signal $V_E$ to be measured being applied to the base of said transistor. The collector of the transistor 24 is connected to the supply voltage (+24 volts, for example) through a resistor 26 having the same value $r$ as the resistor 16'. Similarly, the emitter of the transistor 24 is coupled to the emitter of the transistor 14' through a resistor 28 having substantially the same value $r$ as the resistors 16' and 26. The correction voltage collected at the terminals of the diode 20 is applied to the base of a separating transistor 30, the collector of which is connected through a shock resistor 36 to the input of the diode 10'. In the emitter, a resistor 38 provided with a decoupling capacitor 34 ensures correct biasing of the transistor 30. A resistor 32 having a value equal to $r$ is connected in series with this biasing network. Under these conditions, and provided that the input impedance of the transistor 30 is substantially higher than the resistance $r$, there is not any reaction from one cell to the other and the error voltage $V_{s2}$ (produced by the correction cell) has the same variation in time as that of the error voltage $\Delta V_{s1}$ within the storage cell proper. In other words, the transistor 30 injects a current $\Delta i$ determined by the resistor 32 having a value equal to $r$:

$$\Delta i = \Delta V_{s2} / r$$

Said current which passes through the resistor 16' having a value equal to $r$ produces an equivalent correction electromotive force equal to $\Delta V_{s2}$.

Figure 5:
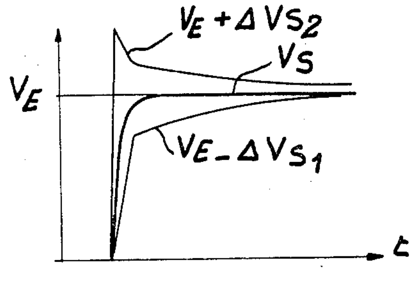
FIG. 5 is an explanatory diagram which brings out the mode of correction employed in the device of FIG. 4 in order to reduce the access time.

In consequence, the correction can be represented schematically as shown in FIG. 5. In this figure, $V_E - \Delta V_{s1}$ designates the output voltage as it appears in the case of the diagram of FIG. 1. The curve $V_E + \Delta V_{s2}$ represents the electromotive force of the generator equivalent to the circuit having an internal impedance $r$ (resistor 16') which charges the capacitor through the diode 10'. Finally, the curve $V_s$ gives the variation in the corrected output voltage as provided by the device of FIG. 4. It is apparent from this curve that the access time (namely the time which is necessary to attain the input amplitude to within $\epsilon$ percent) is substantially reduced. By way of example, it can be stated that the device of FIG. 4, in which provision is also made for correction capacitors, has made it possible to reduce the access time necessary for ensuring that $V_s$ is equal to the input voltage to within 1 percent from approximately 300 nanoseconds to approximately 5 nanoseconds. It must also be noted that the value $r$ of the resistors 16', 26 and 28 is not critical and has little influence as long as it is smaller than 200 ohms.

It is assumed in the schematic diagram of FIG. 4 that the current gains of the transistors are very high and that absolute identity can be achieved between on the one hand the storage cell and the transistor 14' and, on the other hand, the correction cell and the transistor 24. In fact, the current gains have a finite value and the currents which pass therein are not of strictly equal value. Finally, the transistor 30 injects upstream of the diode 10' a current Δi, the value of which is not exactly $\Delta V_{52}/r$. In consequence, the resistors 16', 28 and 26 will not have exactly a common value $r$ in practice and it will be found necessary to provide the resistor 28 with a value which is slightly smaller than the common value of the resistors 16' and 26 in order to endow the transistors 14' and 24 with a gain which is slightly greater than 1 and compensates for the loss of level. Similarly, the value of the resistor 32 will also be slightly lower than that of the resistors 16' and 26. Moreover, the existence of parasitic capacitances and the decrease in current gain when the frequency increases entails the need to introduce correction capacitors of low value (not illustrated in FIG. 4) which tend to shorten the time interval $t_1 - t_0$.

The device illustrated in FIG. 4 has a much shorter access time than devices of the prior art. However, its holding time is not improved since this latter is largely determined by the input impedance of the circuit into which the capacitor 12' is discharged. The invention also proposes a device as hereinabove defined but which is additionally characterized by a substantially longer holding time.

This result is achieved by connecting in cascade a plurality of stages of the type illustrated in FIG. 4, but in which the value of the storage capacitance 12' increases with the positional order of the stage, in such a manner as to ensure that the holding time of any one stage is compatible with the access time of the following stage, taking account of the maximum error. In the description which now follows, the supplementary systematic error introduced as a result of multiplication of the stage number $n$ must not be confused with the errors which are liable to be introduced as a result of an access which is too slow at the input of a device or of a holding time at the output which is too short.

It is logical to adopt the same common value $\epsilon$ in the case of these three distinct relative errors.

The inventors have also noted that the following facts:

the ratio of an access time to a holding time in the case of one stage remains substantially constant when these parameters are modified under the action of a modification of the capacitance 12';

again in the case of one stage, the holding times $t_m$ at $\epsilon$ percent and $t'_m$ at $\epsilon/n$ percent are related by the approximate equation:

$$t_m = n.\ t'm,\ ;$$

the access times $t_a$ at $\epsilon$ percent and $t'_a$ at $\epsilon/_n$ percent are related by the approximate equation:

$$t'_a = t_a\ (1 + n\text{-}1/n\ \epsilon\ ),\ \text{that is},\ t'_a \approx t_a$$

If the holding time for one stage at $\epsilon/n$ percent is close in value to the access time (at $\epsilon$ or $\epsilon/_n$ percent) of the following stage, an additional uncertainty is introduced and close in value to $\epsilon/_n$. Independently of any errors which are liable to be introduced and taking into account the access time at $\epsilon$ percent of the first stage and of the holding time at $\epsilon$ percent of the last stage, there exists an additional overall systematic error which is equal to $(n - 1)\ \epsilon/_n$, which is therefore substantially equal to $\epsilon$.

In short, the recorded level undergoes a relative deviation equal to 3 $\epsilon$ when there is applied to the input of the device a rectangular pulse, the duration of which varies between the access time at $\epsilon$ percent of the first stage and the holding time at $\epsilon$ percent of the last stage.

Therefore, when the minimum access time and maximum holding time are defined in respect of a maximum error 3 $\epsilon$, the foregoing considerations make it possible to determine the number $n$ of necessary stages, the characteristics of the end stages, and the law of progression of the storage capacitance C:

$$Cp = C_{(p\text{-}1)} \cdot t'_{m\,(p\text{-}1)}/t_{a\,(p\text{-}1)}$$

wherein $p$ designates the order of the stage.

Figure 6:
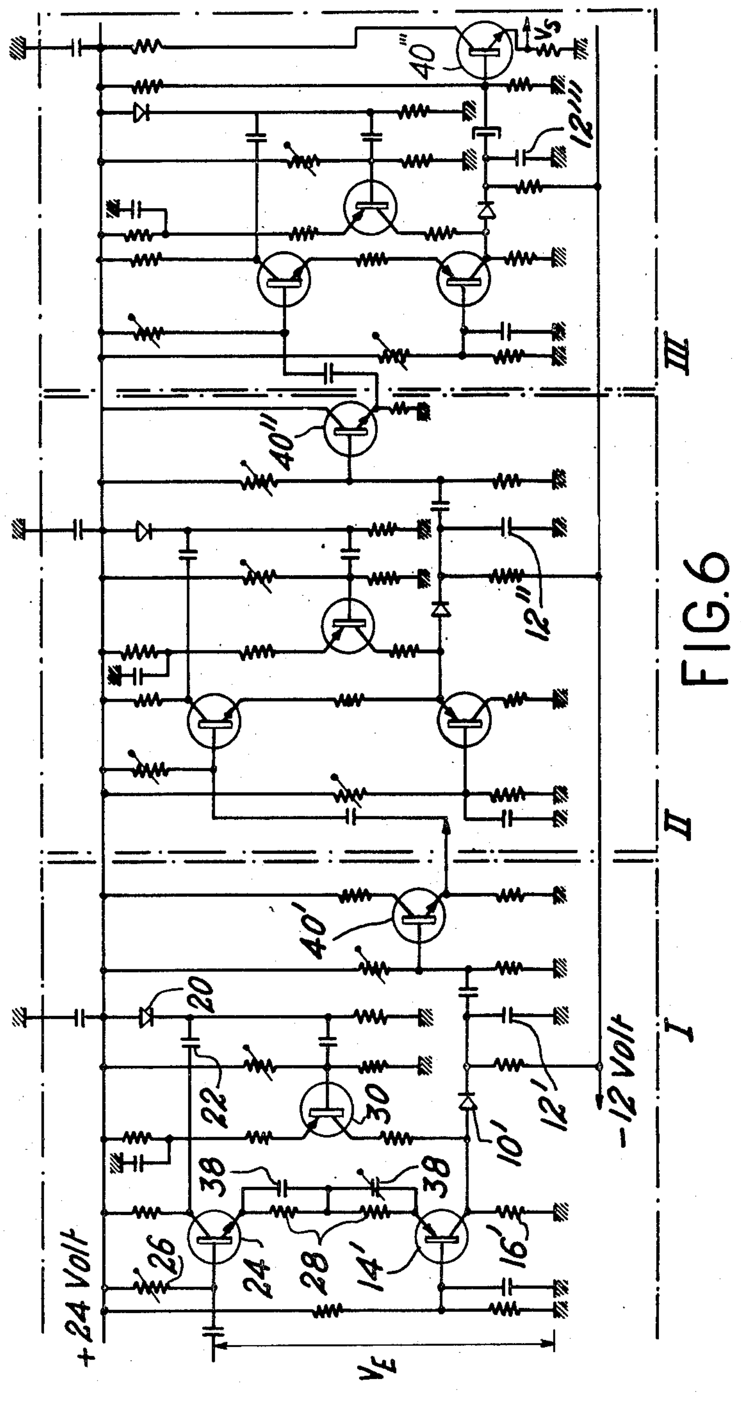
FIG. 6 is a diagram of a device which differs essentially from the device of FIG. 4 in that it comprises a number of cascade-connected stages.

The device according to the invention which is illustrated diagrammatically in FIG. 6 is made up of three cascade-connected stages. The number of three stages is clearly not given by way of limitation, although the gain obtained from an additional stage does not usually justify the increased complexity.

The first stage I is practically identical in constructional design to the stage illustrated in FIG. 4 and the same reference numerals are employed in both cases. However, there are shown in FIG. 6 capacitors 38 for correcting the effect of parasitic capacitances and of variations in the characteristics of the transistors as a function of the frequency.

The output signal of the storage cell is applied to the base of the transistor 40' which is mounted as an impedance matching circuit and drives the second stage II. This second stage is very similar to the first in constructional design and will not be fully described. It must simply be noted that stage II does not have any capacitors for correcting parasitic capacitances since the capacitor 12'', which performs the same function as the capacitor 12' of stage I, has a higher value and makes the action of said parasitic capacitance negligible. The ratio between the capacitances of the capacitors 12'' and 12' is substantially equal to the ratio of the access time of stage II (namely the holding time of the first stage) to the access time of stage I. By way of example, a device which has actually been constructed comprises a capacitor 12' having a value of 50 picofarads and a capacitor 12'' having a value of 1,000 picofarads.

Stage III has a constructional design which is practically identical with that of stage II and the stored output voltage is read from the emitter resistor of the transistor 40'' of the matching stage; while remaining within the scope of the example given above, it will be found necessary to adopt a capacitor 12''' having a value of approximately 20,000 picofarads. Again in the case of the example, there is thus obtained an access time with $\epsilon$= 5 percent which is 5 nanoseconds and a holding time with $\epsilon$= 5 percent of 400 microseconds with an non-linearity of the order of 1 percent over the entire operating range which extends from 200 millivolts to 8 volts.

It is readily apparent that the invention is not limited to the particular embodiments which have been described by way of example with reference to the drawings and that the scope of this patent extends to alternative forms of either all or part of the arrangements described which remain within the definition of equivalent means.

What we claim is:

1. An electrical circuit for storing the amplitude of an electric signal, comprising:
an input stage for impedance matching,
connected to said input stage a storage cell having a first diode and a first capacitor,
connected to said input stage a correcting storage cell having a second diode and a second capacitor with substantially the same electrical characteristics as those of said first diode and first capacitor,
means for collecting the voltage at the terminals of said second diode and for applying said voltage on the input of said storage cell, and
means for sensing the charging voltage of said first capacitor.

2. An electrical circuit according to claim 1, wherein said input stage for impedance matching is a current-generating stage.

3. An electrical circuit according to claim 2, wherein said input stage comprises a first transistor and a second transistor complemtary of said first transistor, the collector of said first transistor being connected to ground through a resistance of value r and connected to said first diode, the emitter of said first transistor being coupled to the emitter of said second transistor through a resistance having substantially the value r, the collector of said second transistor being connected to a power supply through a resistance having substantially the value r and connected to said second diode, the electric signal to be stored being applied to the base of said second transistor.

4. An electric circuit according to claim 2 wherein said means for collecting the voltage at the terminal of said second diode and for applying said voltage on the input of said storage cell include a transistor mounted as a separating stage between said second diode and said first diode.

5. An electric circuit according to claim 2 wherein said first diode is pre-biased.

6. An electrical circuit according to claim 1 wherein said means for collecting the voltage at the terminal of said second diode and for applying said voltage on the input of said storage cell are constituted by a transistor mounted as a separating stage between said second diode and said first diode.

7. An electrical circuit according to claim 1, wherein said first diode is pre-biased.

8. An electrical circuit comprising a series of stages, each stage being an electrical circuit according to claim 1, the access time of each stage being substantially equal to the holding time of the preceding stage for the same value of the relative reference error.

9. A device according to claim 8, wherein an impedancematching transistor mounted as a current generator is disposed between the successive stages.

* * * * *